(12) United States Patent
Pacher et al.

(10) Patent No.: US 8,007,602 B2
(45) Date of Patent: Aug. 30, 2011

(54) SPRING ELEMENT MADE FROM A FERRITIC CHROMIUM STEEL

(75) Inventors: Oskar Pacher, Graz (AT); Gisbert Kloss-Ulitzka, Neuenrade (DE); Victor Castro, Dortmund (DE)

(73) Assignee: Stahlwerk Ergste Westig GmbH, Schwerte (DE)

( * ) Notice: Subject to any disclaimer, the term of this patent is extended or adjusted under 35 U.S.C. 154(b) by 0 days.

(21) Appl. No.: 12/700,198

(22) Filed: Feb. 4, 2010

(65) Prior Publication Data
US 2010/0132846 A1 Jun. 3, 2010

Related U.S. Application Data

(63) Continuation of application No. 10/524,719, filed as application No. PCT/EP03/09132 on Aug. 18, 2003, now abandoned.

(30) Foreign Application Priority Data

Aug. 16, 2002 (DE) .................. 102 37 446
Jul. 21, 2003 (DE) .................. 103 33 272

(51) Int. Cl.
*C22C 38/50* (2006.01)
*C21D 9/02* (2006.01)
(52) U.S. Cl. ......... 148/325; 267/158; 148/908; 148/580
(58) Field of Classification Search .......... 148/908, 148/325, 580, 327; 267/158
See application file for complete search history.

(56) References Cited

U.S. PATENT DOCUMENTS

| 2,527,521 A | 10/1950 | Bloom |
| 4,022,640 A | 5/1977 | Tanczyn |
| 5,178,693 A | 1/1993 | Miyakusu et al. |
| 5,759,304 A | 6/1998 | Kluge |
| 6,544,356 B2 | 4/2003 | Katagiri et al. |
| 6,939,418 B2 | 9/2005 | Bilgen et al. |
| 2001/0034921 A1* | 11/2001 | Kang ............ 15/250.452 |

FOREIGN PATENT DOCUMENTS

| DE | 43 01 754 A1 | 7/1994 |
| DE | 101 13 657 A | 9/2002 |
| EP | 0 481 377 A2 | 4/1992 |
| EP | 1083237 A2 | 3/2001 |
| EP | 1 099 773 A1 | 5/2001 |
| EP | 1 113 084 A1 | 7/2001 |
| EP | 1 288 089 A2 | 3/2003 |
| JP | 60213246 A | 10/1985 |
| JP | 11302737 A | 11/1999 |
| JP | 2001 107195 | 4/2001 |
| JP | 2001123248 | 5/2001 |
| WO | WO 01/58732 A1 | 8/2001 |

OTHER PUBLICATIONS

Machine translation of JP2001-123248 May 8, 2001.*

* cited by examiner

*Primary Examiner* — Roy King
*Assistant Examiner* — Jie Yang
(74) *Attorney, Agent, or Firm* — Henry M. Feiereisen; Ursula B. Day

(57) ABSTRACT

Spring element, in particular spring rail for wipers, in particular of motor vehicles, with a low tendency to vibrate or a high attenuation, made from a ferritic chromium steel comprising 0.03 to 0.12% of carbon, 0.2 to 0.9% of silicon, 0.3 to 1% of manganese, 13 to 20% of chromium, 0.1 to 2.0% of molybdenum, 0.05 to 1.0% of copper, 0.02 to 0.05% of nitrogen, less than 0.01% of titanium, 0.01 to 0.10% of niobium and 0.02 to 0.25% of vanadium, remainder iron.

10 Claims, 4 Drawing Sheets

SPRING ELEMENT MADE FROM A FERRITIC CHROMIUM STEEL

CROSS-REFERENCES TO RELATED APPLICATIONS

This application is a continuation of prior filed U.S. application Ser. No. 10/524,719, filed Feb. 15, 2005, the priority of which is hereby claimed under 35 U.S.C. §120 and which in turn is the U.S. national stage of PCT International application no. PCT/EP2003/009132, filed Aug. 18, 2003, which designated the United States and has been published but not in English as International Publication No. WO 2004/018271 and which claims the priority of German Patent Applications, Serial Nos. 102 37 446.5, filed Aug. 16, 2002 and 103 33 272.3, filed Jul. 21, 2003, pursuant to 35 U.S.C. 119(a)-(d).

The content of U.S. application Ser. No. 10/524,719 is incorporated herein by reference in its entirety as if fully set forth herein.

BACKGROUND OF THE INVENTION

The invention relates to a spring element, in particular a spring rail for wipers, as are used for the generally curved windshields of motor vehicles, rail-borne vehicles, ships and aircraft.

Wipers usually comprise a wiper lever with a wiper blade composed of a spring rail and a wiper strip which is pressed onto the screen to be cleaned with the aid of spring forces. To achieve the necessary cleaning action, it is necessary for elastomeric wiper strip always to bear tightly against the screen surface irrespective of the curvature of the screen. This is ensured by spring elements arranged between the wiper lever and the wiper strip, in particular including the spring rail, the length of which substantially corresponds to that of the elastomeric wiper strip.

However, high driving speeds and/or wind speeds give rise to turbulence and vibrations, with the result that the wiper strip does not bear uniformly and with sufficient force against the screen over its entire length and/or throughout its entire reciprocating motion, with the result that films of water and dirt adhering to the screen are not reliably removed.

Modern wipers comprise a main bracket which is arranged in articulated fashion on a motor-driven wiper lever and has a claw bracket articulatedly secured to each of its two ends. The claw brackets are articulatedly connected at one end to a spring rail and at the other end to claws, the two ends of which are in each case connected, via joints, to the spring rail. The spring rail is embedded in the elastomeric wiper strip over its entire length.

The spring system, which in total comprises five brackets and a spring rail, is intended to ensure that the wiper strip bears uniformly against the screen. To achieve this, and in particular to suppress rattling vibrations, the distances between the two claw brackets and the length of the latter have to be matched to the screen geometry. Further criteria are the size of the screen surface to be covered, the length of the wiper blades, the orientation of the reciprocating-motion axis of the wiper arm with respect to the screen surface and in particular the spring force and the width and thickness of the spring rail. It is scarcely possible to record these parameters by calculation; consequently, the nature of the claw brackets and their position with respect to the wiper blade are generally based on practical experience.

Despite all efforts, it has only to a certain extent been possible to avoid rattling and the occurrence of vibrations at high driving speeds and/or wind speeds. Accordingly, the result of wiping is unsatisfactory and, moreover, there is extensive abrasion to the wiping edge of the wiper strip, as well as disruptive operating noise, and furthermore the service life of the wiper strip is shortened.

To reduce the noise, European laid-open specification 1 288 089 A2 proposes reducing the coefficient of friction of a wiper strip with a special profile with the aid of a polymer coating. However, this is not only highly complex but also makes it easier for vibrations to occur as a result of the lower coefficient of friction. Furthermore, PCT laid-open specification WO 01/58732 A1 proposes using two spring rails running parallel to one another but with different resonant frequencies instead of a single spring rail extending over virtually the entire length of the wiper strip, in order to suppress the occurrence of wiper blade vibrations. However, different resonant frequencies require spring rails which differ in terms of their cross section and/or material, and therefore entail additional outlay both on production and on stockholding and in terms of spare parts. An additional factor is that it is only possible to avoid vibrations by using two spring rails with different resonant frequencies within a relatively narrow frequency window, and therefore it is not possible to cover all operating or vibration states which occur in practise.

The material used for spring elements and spring rails is usually alloyed steels, since pure carbon steels have poor damping properties and therefore do not break down disruptive vibrations sufficiently quickly. This is because scarcely any energy-consuming processes take place within the microstructure.

SUMMARY OF THE INVENTION

In view of this background, the problem on which the invention is based is to improve the vibration properties of spring elements, for example the wiping performance of wipers having a spring rail.

To this end, the invention proposes that the material used for spring elements, in particular spring rails, be a ferritic chromium steel comprising 0.03 to 0.12% of carbon, 0.2 to 0.9% of silicon, 0.3 to 1% of manganese, 13 to 20% of chromium, 0.1 to 2.0% of molybdenum, 0.05 to 1.0% of copper, 0.02 to 0.05% of nitrogen, less than 0.01% of titanium, 0.01 to 0.10% of niobium and 0.02 to 0.25% of vanadium, remainder iron.

The steel may contain at most 0.1% of carbon, at most 1.5% of molybdenum and 0.1% of copper up to 0.5%, and at least 0.03% of nitrogen, individually or in combination with one another.

A steel containing 0.06 to 0.1% of carbon, 15 to 18% of chromium and 0.8 to 1.5% of molybdenum has proven particularly suitable.

The spring element according to the invention has a coercive force $H_C$ of from 190 to 240 A/cm and a saturation magnetization $J_{ma}$ of from 1.45 to 1.75 T, which corresponds to a ferrite content in the microstructure of approximately 10% or 55%.

This data can be achieved, for example, by cold strip or flat wire formed from the alloy according to the invention being cold-formed and then solution-annealed and cooled in air or quenched with water, so as to set a magnetizable microstructure having the abovementioned magnetic saturation. Then, the desired coercive force can be set, if appropriate in steps, with the aid of at least one further cold-forming operation.

To improve the mechanical and/or optical properties, the starting material or the spring element (spring rail) may be provided with a preferably 50 to 150 μm thick coating of a thermosetting powder coating. The coating is produced under the action of heat and is therefore inevitably associated with advantageous tempering of the material.

The spring elements according to the invention are distinguished by a high spring force and a high resistance to weathering, and in particular by a spring magneto-mechanical vibration damping. The advantageous damping performance makes it possible to dispense with the complex claws and if appropriate also the claw bracket, and therefore provides a wiper in which the wiper arm acts directly on the spring rail via the main bracket.

The microstructure consisting of ferrite and martensite with nonmagnetic fine precipitations, such as nitrides and carbonitrides, ensures high initial damping, the cause of which is stress-induced domain boundary formation of the microstructural constituents. This involves internal changes in the magnetization, such as stress-induced inelastic domain boundary movements, which lead to eddy current losses and thereby consume vibration energy.

BRIEF DESCRIPTION OF THE DRAWING

The invention is explained in more detail below on the basis of drawings in combination with exemplary embodiments. In the drawings.

DETAILED DESCRIPTION OF PREFERRED EMBODIMENTS

Figure 1:
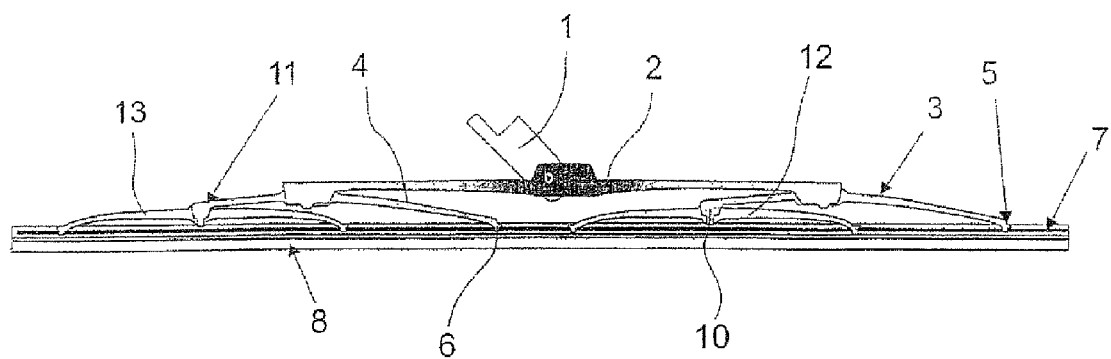
FIG. 1 shows the structure of a conventional wiper arm.

According to the illustration shown in FIG. 1, a conventional wiper comprises a wiper arm 1, the end of which is articulatedly connected to a main bracket 2. In each case one claw bracket 3, 4 is articulatedly mounted at both ends of the main bracket. The ends 5, 6 of the longer limbs of the claw brackets 3, 4 engage in an articulated manner on a spring rail 7 which, together with an elastomeric wiper strip 8, serves as wiper blade for removing water and dirt from a vehicle screen.

The shorter limbs of the claw brackets 3, 4, by contrast, are each connected, via joints 10, 11, to a claw 12, 13, the ends of which act in an articulated manner on the spring rail 7.

The use of a spring rail according to the invention makes it possible, in a wiper of the type presented, to dispense with the two claw brackets 3, 4 or also with the claws 12, 13. This reduces the assembly costs for the wiper by approximately 50%. This is true irrespective of the cross-sectional profile of the spring rail, the advantageous damping properties of which manifest themselves for various profiles.

The invention is explained in more detail below on the basis of exemplary embodiments and comparative alloys.

Table I below gives the compositions for five chromium steels according to the invention E1 to E5 and seven comparative steels C6 to C12.

TABLE I

| Steel | % C  | % Si | % Mn | % Cr   | % Ni   | % Mo   | % Cu   | % N    |
|-------|------|------|------|--------|--------|--------|--------|--------|
| E1    | 0.06 | 0.50 | 0.65 | 17.3   | 0.26   | 0.15   | 0.21   | 0.030  |
| E2    | 0.07 | 0.52 | 0.48 | 17.0   | 0.32   | 0.14   | 0.15   | 0.045  |
| E3    | 0.08 | 0.48 | 0.52 | 16.2   | 0.35   | 0.10   | 0.12   | 0.040  |
| E4    | 0.10 | 0.65 | 0.61 | 17.6   | 0.40   | 0.07   | 0.15   | 0.035  |
| E5    | 0.06 | 0.44 | 0.92 | 16.8   | 0.30   | 0.82   | 0.35   | 0.035  |
| C6    | 0.03 | 0.58 | 0.49 | 17.1   | 0.32   | 0.10   | 0.12   | 0.040  |
| C7    | 0.35 | 0.62 | 0.69 | 14.1   | 0.18   | 0.08   | 0.17   | 0.030  |
| C8    | 0.07 | 0.45 | 0.98 | 18.0   | 6.12   | 0.12   | 0.09   | 0.360  |
| C9    | 0.10 | 0.86 | 1.22 | 17.4   | 8.15   | 0.36   | 0.19   | 0.020  |
| C10   | 0.47 | 0.25 | 0.55 | Traces | Traces | Traces | Traces | Traces |
| C11   | 0.55 | 0.48 | 0.94 | 0.95   | Traces | Traces | Traces | Traces |
| C12   | 0.79 | 0.18 | 0.78 | Traces | Traces | Traces | Traces | Traces |

The tensile strength $R_m$ coercive force $H_C$ saturation magnetization J damping as a percentage amplitude after 15 seconds damping as a percentage amplitude after 25 seconds of the steels were tested.

To produce a spring rail, the alloys E1 to E6 according to the invention with a cross section of 28 mm² were used in the soft-annealed state. After initial cold-forming, the specimens were exposed to solution-annealing at 1050° C. for 12 minutes, followed by rapid cooling and further cold-forming until a final cross section of 6 mm² was produced. These processing steps resulted in a total deformation of 78%. The specimens, in order to be prepared for a coating or tempering treatment, were then cleaned in an ultrasound bath, heated to 350° C. and coated with a powder coating. The coating was applied during the cooling phase of the tempering treatment in order to utilize the process heat of the spring rail to harden the powder coating.

One of the specimens formed from alloy E4 was additionally pre-deformed prior to the abovementioned first cold-forming, then annealed and then treated further in the same way as the other specimens (cf. Test 8).

The test results are compiled in Table II below, which in addition to the layer thickness also gives the hardening temperature or the coating temperature; it effects tempering and leads to an increase in the tensile strength, as demonstrated by the damping properties of Test 5, which relates to a specimen of alloy E1 without coating and accordingly also without tempering during the coating operation. This reveals the importance of the tempering for the increase in strength.

TABLE II

| Test No. | Steel | Coercive force HC (A/cm) | Saturation magnetization J (T) | Tensile strength Rm (MPa) | % Residual amplitude after 0.15 s | % Residual amplitude after 0.25 s | Coating thickness/hardening temperature mm | Coating thickness/hardening temperature °C. | Assessment Strength | Assessment Damping |
|---|---|---|---|---|---|---|---|---|---|---|
| 1 | E1 | 217 | 1.65 | 1682 | 39.0 | 15.0 | none | 340 | + | good |
| 2 | E1 | 216 | 1.67 | 1695 | 31.0 | 14.0 | 0.8 | 340 | + | good |
| 3 | E1 | 219 | 1.52 | 1774 | 36.0 | 12.5 | 0.8 | 340 | + | very good |
| 4 | E1 | 192 | 1.82 | 1685 | 54.0 | 35.0 | 0.8 | 340 | + | poor |
| 5 | E2 | 225 | 1.76 | 1851 | 35.0 | 12.0 | 0.8 | 340 | + | very good |
| 6 | E3 | 215 | 1.72 | 1712 | 35.0 | 12.5 | 0.8 | 340 | + | very good |
| 7 | E4 | 198 | 1.62 | 1849 | 34.5 | 10.0 | 0.8 | 340 | + | very good |
| 8 | E4 | 205 | 1.63 | 1670 | 35.0 | 11.0 | 0.8 | 340 | + | very good |
| 9 | E5 | 230 | 1.53 | 1716 | 34.0 | 11.0 | 0.8 | 340 | + | very good |
| 10 | E5 | 232 | 1.55 | 1728 | 33.0 | 10.0 | 0.8 | 340 | + | very good |
| 11 | C6 | 38 | 1.54 | 535 | n.d. | n.d. | 0.8 | 340 | − | |
| 12 | C6 | 47 | 1.48 | 726 | n.d. | n.d. | 0.8 | 340 | − | |
| 13 | C6 | 49 | 1.43 | 980 | n.d. | n.d. | none | — | − | |
| 14 | C7 | 382 | 1.58 | 1682 | 60.0 | 39.0 | 0.8 | 340 | + | average |
| 15 | C8 | 936 | 0.32 | 1640 | 55.0 | 34.0 | 0.8 | 340 | + | poor |
| 16 | C9 | 914 | 0.36 | 1728 | 54.5 | 34.0 | 0.8 | 340 | + | poor |
| 17 | C9 | 973 | 0.31 | 1620 | 57.0 | 35.0 | 0.8 | 340 | + | insufficient |
| 18 | C9 | 766 | 0.22 | 1452 | n.d. | n.d. | 0.8 | 340 | − | |
| 19 | C10 | 123 | 1.83 | 1820 | 60.0 | 39.0 | none | — | + | poor |
| 20 | C10 | 125 | 1.82 | 1845 | 59.0 | 38.0 | 0.8 | 340 | + | poor |
| 21 | C11 | 129 | 1.84 | 1960 | 61.0 | 38.0 | none | — | + | poor |
| 22 | C11 | 131 | 1.91 | 1986 | 59.0 | 37.0 | 0.8 | 340 | + | poor |
| 23 | C12 | 122 | 1.97 | 2020 | 63.0 | 42.0 | none | — | + | insufficient |
| 24 | C12 | 122 | 1.97 | 2022 | 62.0 | 40.0 | 0.8 | 340 | + | insufficient |

Tests 11 to 13 and 18 relate to steels which are too soft and do not have sufficient spring properties. Therefore, there was little sense in determining the spring damping. Accordingly, no residual amplitude is given for these tests in Table II (n.d.).

In general with regard to the residual amplitude, it is the case that the lower the residual amplitude given, the better the vibration damping.

Figure 2:
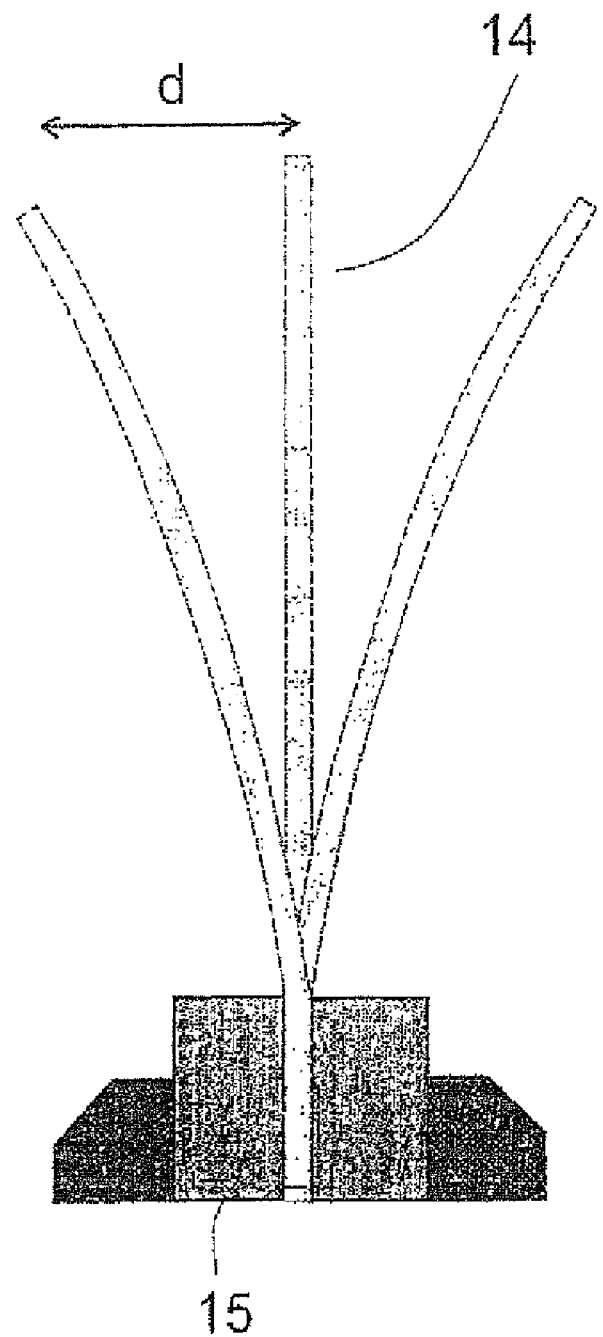
FIG. 2 shows a measuring apparatus for determining the vibration performance of spring rails.

The vibration performance was determined with the aid of the measurement apparatus illustrated in FIG. 2. During the tests, one side of the specimens 14 was clamped in a pedestal 15, then the specimens were made to deviate laterally over a distance of D=11 mm and then let go. The vibrations of the freely vibrating specimens as a function of time were recorded with the aid of a sensor, the amplified signal was fed to a PC measurement card and stored with a time resolution of 4400 measured values per second as a vibration diagram. The envelope of this vibration diagram was determined, and the percentage residual amplitude compared to the starting amplitude at instant zero (100%) was in each case determined on the basis of the resulting envelope curve or damping curve 16 after 0.15 and 0.25 second.

The magnetic characteristic values of the specimens were determined with the aid of a hysteresis curve from which the values for the coercive force $H_C$ and the saturation magnetization $J_{max}$ were taken in accordance with DIN 50460.

Figure 3:
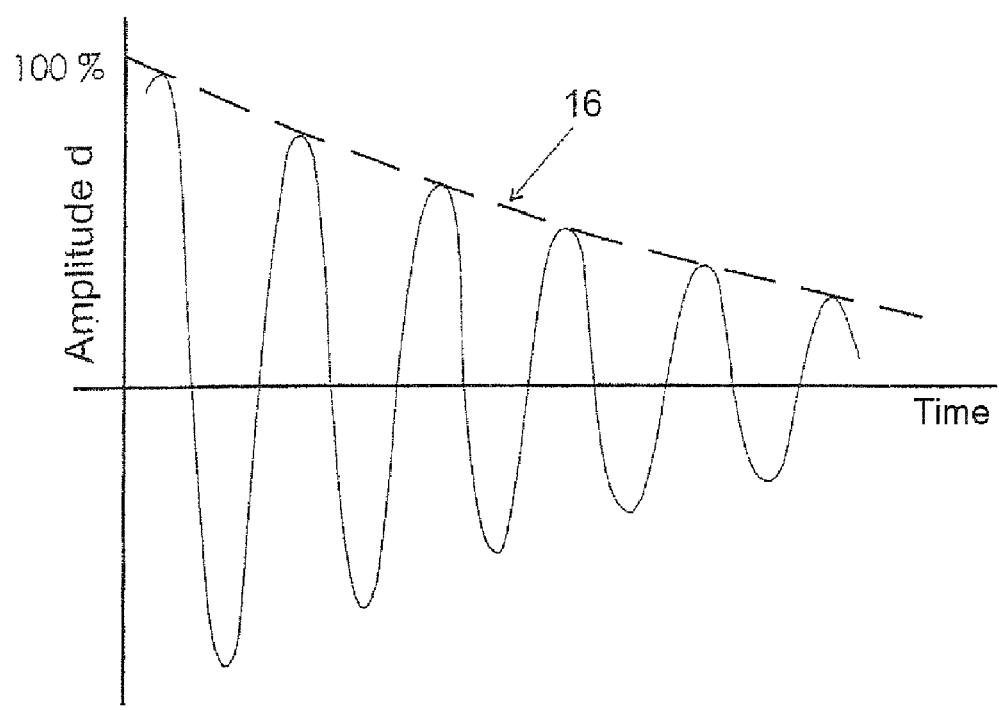
FIG. 3 shows a graph illustrating the vibration performance of conventional spring rails.

FIG. 3 illustrates the typical vibration performance of conventional spring rails. The profile of the envelope or damping curve 16 follows an exponential function. This can be explained by the fact that during the vibration of a leaf spring, a compressive stress or a tensile stress occur alternately at the leaf surface after deflection. A vibration of this type is generally described by a differential equation. The calculations of a vibration are usually based on a linear force relationship. The result of this linear force relationship is that the vibration can be described very successfully by an exponentially decreasing vibration curve. However, if, as in the case of the alloy according to the invention, there are magneto-mechanical interactions in the microstructure, the condition for the linear force relationship is no longer satisfied and a mechanical hysteresis occurs during vibration. This is stronger at high amplitudes or excursions than at low ones, since the energy loss is dependent on the surface area of the hysteresis curve. In such a situation, an exponentially decreasing damping curve is not attained. Rather, there is very strong initial damping (cf. Hornbogen, Metallkunde, 2nd edition).

Figure 4:
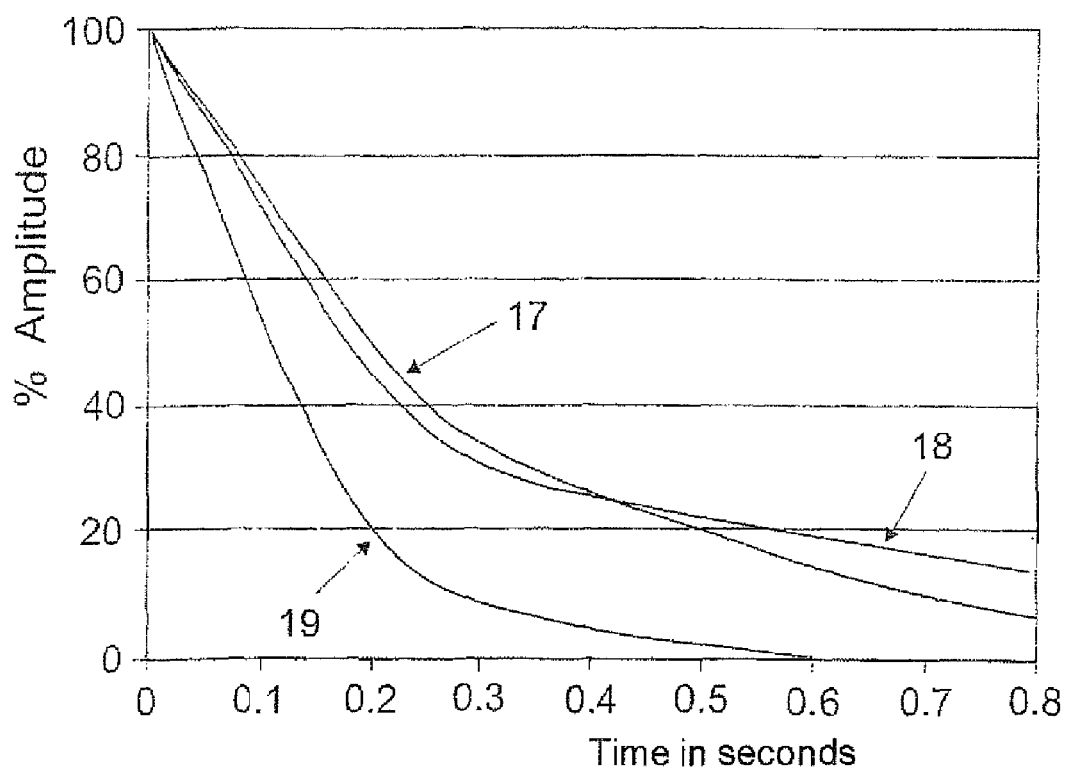
FIG. 4 shows a graph illustrating the vibration performance of a spring rail according to the invention compared to two spring rails made from conventional steels.

As shown in FIG. 4, the two damping curves 17, 18 for the spring rails formed from comparison steels C9 and C10 in Tables I and II behave similarly; these follow Hooke's law. By contrast, curve 19 for the spring rail according to the invention formed from steel E1 in Table I or test 2 in Table II behaves differently. The profile of the curve 19, on account of its relatively steep drop, reveals high initial damping, which can be explained by a nonlinear deviation from Hooke's law, caused by the abovementioned stress-induced domain wall movements as occur within the field of values according to the invention for coercive force and magnetic saturation.

In principle, a mechanical stress a in a material causes a change in the atomic spacing, which in practise manifests itself as strain ε. The known relationship or modulus of elasticity E is derived from this in accordance with the following formula:

$$E = E_G = \sigma \frac{1}{\varepsilon_G}$$

(the index G indicates that the modulus of elasticity is dependent on the lattice strain).

In the case of magnetically coupled microstructural constituents, such as ferrite and martensite, however, a stress, in addition to the lattice strain, also causes a change in the domain arrangement, for which reason an additional strain $\varepsilon_{MM}$ has to be taken into account in the equation. This results in the following relationship $$E = E_G + E_{MM} = \sigma\left(\frac{1}{\varepsilon_G} + \frac{1}{\varepsilon_{MM}}\right)$$

$\epsilon m_{MM}$ represents a combination of all magnetically induced strains and additional strains; it is composed of three component strains and also encompasses the volume magnetostriction and its analogous strain component.

Therefore, the magneto-mechanical damping is produced by the fact that a mechanical stress not only changes the atom spacing (lattice strain) but also gives rise to the changes caused by the stress-induced domain wall movements.

The favorable vibration performance is explained by strong magneto-mechanical damping. This is formed on account of the fact that in the event of vibration the domain arrangements are changed, in the form of an imposed volume magnetostriction, as a result of changes in the mechanical stress over the course of time.

Since the stress-induced domain wall movement is associated with inelastic and eddy current losses, in the event of vibrating loads a mechanical hysteresis occurs, i.e. there is a nonlinear deviation from Hooke's law.

In this context, of course, the strength of the obstacles of the domain wall movements (i.e. the wall energy and therefore the $H_C$ value) also plays a major role, since they are ultimately responsible for the extent of damping. Optimum magneto-mechanical damping by stress-induced domain wall movements is accordingly only possible within a certain field of values for J (magnetic polarization) and HC (coercive force).

The damping can be improved further by coating with the aid of a thermosetting powder coating. A coating of this type has a number of advantageous effects: it increases the resistance to corrosion and the tensile strength and allows a coefficient of friction which is favorable for introduction of a spring rail into the wiper strip and also makes it possible to adapt the surface structure and the appearance to the appearance of the rubber wiper strip.

The excellent damping performance of the spring elements according to the invention (spring rail) is caused by the microstructure, which is composed of soft-magnetic ferrite and in relative terms comparatively hard-magnetic martensite with nonmagnetic fine precipitations of carbides and/or carbonitrides, as well as the volume proportions of the two magnetic phases ferrite and martensite. The ferrite has a high magnetic polarization, i.e. a very strong internal magnetization compared to the saturation magnetization of pure iron at 2.2 T or 22000 Gauss. This results in slight remagnetization, i.e. the ferrite is magnetically soft, which manifests itself by a low coercive force or a low wall energy. Although martensite has a lower magnetizability or a significantly lower magnetic polarization, compared to ferrite, its magnetic domains are more strongly fixed in energy terms on account of the fine precipitations, but also on account of alloying elements dissolved in the crystal lattice. Compared to ferrite, the martensite is more difficult to remagnetize, which means that it is magnetically harder and accordingly has a higher HC value.

The magnetic domains are magnetizable regions which are delimited by what are known as Bloch walls. The stability of the magnetic domains is expressed in what is known as the wall energy. The wall energies of ferrite are generally low and therefore give rise to easy remagnetization or a low coercive force below approximately 1 A/cm.

The damping performance can be set or optimized with the aid of the proportion by volume of the two magnetizable microstructure constituents ferrite and martensite (preferably 30% ferrite, remainder martensite including small amounts of nonmagnetic precipitations) and the resultant magnetic hardness. This is done with the aid of solution annealing with a duration of from 0.5 to 60 min at 900 to 1100° C. and cold-forming with a total degree of deformation of over 65%. In this way, it is possible to achieve a magnetic saturation, as a total value for the two magnetizable phases ferrite (10 to 55%, remainder substantially martensite) and martensite, of the order of magnitude of from 1.45 to 1.75 T.

To set the magnetic hardness, the cold-forming may be followed by a tempering treatment, for example with a duration of from 0.1 to 1 min at a temperature of from 200 to 380° C. in order to achieve a coercive force of from 190 to 320 A/cm. The tempering treatment can be carried out at the same time as the coating with a hot-hardening powder coating or coating.

What is claimed is:

1. A wiper blade for a wiper, comprising a spring element connected to a wiper arm and made from a ferritic chromium steel, comprising, by weight percent,
    0.03 to 0.12% of carbon
    0.2 to 0.9% of silicon
    0.3 to 1% of manganese
    13 to 20% of chromium
    less than 0.5% of nickel
    0.1 to 2 of molybdenum
    0.05 to 1.0% of copper
    0.02 to 0.5% of nitrogen
    less than 0.01% of titanium
    0.01 to 0.10% of niobium
    0.02 to 0.25% of vanadium, remainder iron, said spring element comprising a coercive force ranging from 190 to 320 A/cm and a magnetic saturation ranging from 1.45 to 1.75 T,
    wherein the spring element has a microstructure comprised of 10 to 55% by weight of a soft-magnetic ferrite and a remainder of substantially hard-magnetic martensite.

2. The wiper blade of claim 1, wherein the steel contains, by weight percent, at most 0.1% of carbon, at most 1.5% of molybdenum, 0.1 to 0.5% of copper and at least 0.03% of nitrogen.

3. The wiper blade of claim 1, wherein the spring element includes, by weight percent, a carbon content of from 0.06 to 0.1%, and a chromium content of from 15 to 18%.

4. The wiper blade of claim 1, wherein the spring element includes a thermosetting powder coating.

5. The wiper blade of claim 4, wherein the thermosetting powder coating has a layer thickness ranging from 0.05 to 0.15 mm.

6. The wiper blade of claim 1, wherein the spring element has a damping performance which is adjustable by solution annealing for 0.5 to 60 min at a temperature of 900 to 1100° C.

7. The wiper blade of claim 6, wherein the damping performance is adjustable by cold-forming with a degree of deformation of over 65%.

8. The wiper blade of claim 7, wherein the spring element has a magnetic hardness which is adjustable by tempering after the cold-forming for 0.1 to 1 min at a tempering temperature of 200 to 380° C.

9. The wiper blade of claim 8, wherein the spring element includes a coating of a hardening temperature which is in the range of the tempering temperature.

10. The wiper blade of claim 1, wherein the spring element is constructed in the form of a spring rail.

* * * * *